United States Patent

[11] 3,584,656

| [72] | Inventors | Leendert Van Assendelet;<br>Bertus H. Zandstra, both of Arnhem, Netherlands |
|---|---|---|
| [21] | Appl. No. | 799,270 |
| [22] | Filed | Feb. 14, 1969 |
| [45] | Patented | June 15, 1971 |
| [73] | Assignee | Algemene Kunstzij de Unie, N.V.<br>Arnhem, Netherlands |
| [32] | Priority | Feb. 17, 1968 |
| [33] | | Netherlands |
| [31] | | 68-02285 |

[54] MANUFACTURE OF POLYMERIC TUBULAR FILMS
9 Claims, 10 Drawing Figs.

[52] U.S. Cl. ................................................ 138/141, 138/129, 138/137
[51] Int. Cl. ........................................................ F16l 11/04, F16l 11/12

[50] Field of Search............................................. 138/115, 118, 128, 129, 141, 178, 137

[56] References Cited
UNITED STATES PATENTS

| 60,555 | 12/1866 | Punderford | 138/128 |
| 2,176,109 | 10/1939 | Ratay | 138/128X |
| 2,358,743 | 9/1944 | Smith | 138/128 |
| 2,932,323 | 4/1960 | Aries | 138/137 |
| 3,499,470 | 3/1970 | Strole | 138/128X |

Primary Examiner—Herbert F. Ross
Attorney—Stevens, Davis, Miller & Mosher

ABSTRACT: A polymeric tubular film comprising a film wall made up of at least three polymeric layers which are alternately formed of different compound polymers and which at least partially have a spiralling shape. At least one of the inner and outer surfaces of the wall is formed by a single substantially homogeneous one-polymer layer. Also a process and an apparatus for the manufacture of such film are disclosed.

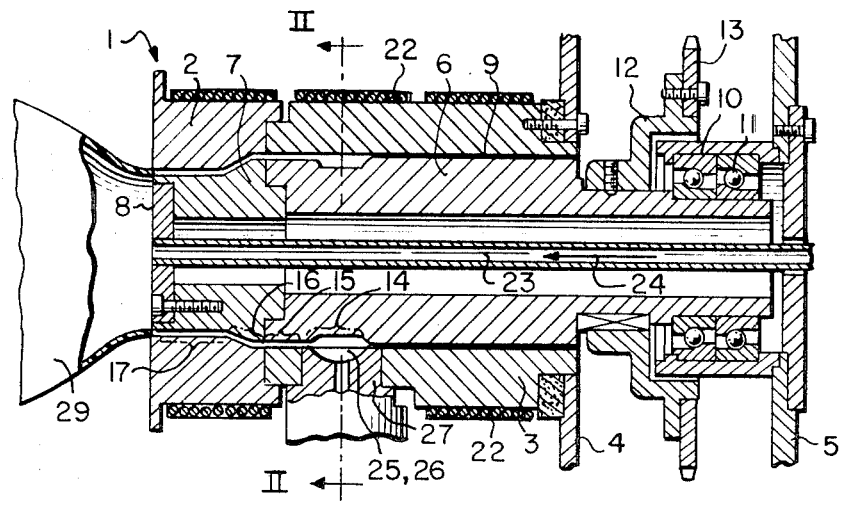
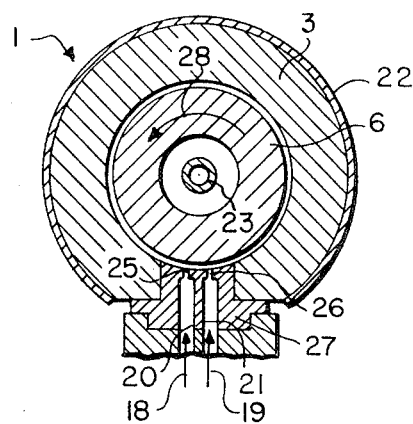
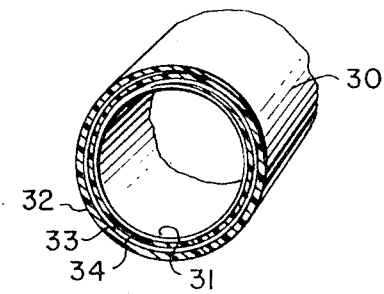
INVENTORS
LEENDERT VAN ASSENDELFT
& BERTUS HEIN ZANDSTRA
BY Stevens, Davis, Miller & Mosher
ATTORNEYS

PATENTED JUN 15 1971

INVENTORS
LEENDERT VAN ASSENDELFT
& BERTUS HEIN ZANDSTRA

BY Stevens, Davis, Miller & Mosher
ATTORNEYS

MANUFACTURE OF POLYMERIC TUBULAR FILMS

This invention relates to polymeric tubular film having a film wall that consists of at least three polymeric layers which are alternately formed of different component polymers and which at least partially have a spiralling shape and to a process and an apparatus for the manufacture of such tubular films.

A tubular film similar to those of this invention are known. The known tubular film is manufactured by first entirely filling a stationary annular space with a liquid mass that flows in an axial direction along the annular space and which is made up of at least two different component polymers in such a way that the annular space alternately contains different polymers in its circumferential direction. Each polymer extends over the entire width of the annular space. In the circumferential direction of the annular space each of the component polymers recurrently extends through a small angle of, for instance, a few degrees. The polymer stream thus formed, which flows in an axial direction, subsequently arrives in an adjoining second annular space, the walls of which rotate relative to each other, so that in the second annular space a very large number of overlapping, spiralling polymer layers are formed. Finally, the polymer stream formed in the second annular space is forced in an axial direction through an annular extrusion slit and is cooled down, a tubular film thus being formed. The tubular film manufactured by this process has the disadvantage, however, that both its outer and its inner surface are entirely formed by a large number of narrow polymer stripes which extend in the longitudinal direction of the tube and which alternately consist of the different polymer components.

Advantageously, this invention provides a tubular film, i.e., a film structure in tubular form, which does not show this disadvantage. Thus this invention contemplates a tubular film which has a film wall made up of at least three polymeric layers alternately being formed of different component polymers and having, at least partially, a spiralling shape or configuration and which is further characterized in that at least one of the two surfaces of the wall of the tubular film, i.e., the outer and the inner surfaces, is formed by a single substantially homogeneous one-polymer layer. Moreover, the inner and the outer surfaces of the wall of the tubular film, advantageously, are each formed by a single homogeneous one-polymer layer. Also the tubular film may be so constructed that either the outer surface or the inner surface of the wall (of the tubular film) is formed by a single homogeneous one-polymer layer.

It will be recognized that the tubular film of this invention has the advantage that it has a homogeneous one-polymer layer on at least one surface. This is of great importance in connection with the demands to be made in actual practice of a multilayer film. A multilayer film may, for instance, consist of two component polymers A and B, component A having a high chemical resistance and component B a high strength. In accordance with this invention, a tubular film made up of components A and B may, for instance, consist of the component A on the entire inner surface as well as on the entire outer surface, thus imparting to the film the desired chemical resistance. In this case the component polymer B, which has a high strength, is present in the interior of the film as a spiralling layer. Thus it will be appreciated that the tubular film of this invention may have a one-polymer layer forming its outer surface, another one-polymer layer forming its inner surface and one or more spiralling polymer layers disposed therebetween. It is also possible for the layered component polymers present in the film alternately to have, for instance, the following properties: a favorable smell or taste, good sealability, good printability, and good wear resistance.

In a preferred embodiment of the film of this invention, each spiralling layer extends, relative to the center of the tubular film, through an angle of at least 360°.

The homogeneous, one-polymer, inner and/or outer surface of the multilayer tubular film is also especially suitable for further processing of the film, more particularly for the sealing. Also the interior of the film retains its spiralling structure, which favorably affects the properties of the film, for instance, its strength.

The processability of the tubular film and its suitability for certain applications may be improved when at least one of the two surfaces of the film wall is formed by a layer which consists of a single-component polymer and which has a thickness in the radial direction that is different from, and preferably greater than that of any one of the spiralling layers.

In certain cases the homogeneous inside and outside layers of the film preferably consist of one and the same component polymer. More particularly, it is in this way insured that the multilayer tubular film, which is built up in a unique way, can be processed for various applications in a substantially conventional manner, i.e., similar to that used for known monolayer, monocomponent plastic films. Moreover, the tubular film may be processed on conventional machines.

This invention also is directed to a process for the manufacture of a tubular film in which two or more supply streams of different liquid polymers are rotated one beside the other in an annular zone to form a layered annular stream, the number of layers of alternately different component polymers is increased due to the rotation to at least three layers, and the layered stream is extruded through an annular slit to form a tubular film and the film is cooled. One embodiment of the process is further characterized in that the polymer supply streams are fed into the annular stream in the annular zone only on a part of the circumference thereof. Advantageously, that part of the circumference where the polymers are fed to the annular stream extends through an angle of not more than 45°, and preferably of from about 5° to 10°. The process may be carried out in a very simple and effective manner when each of the different component polymers is fed to the beginning of the rotating annular polymer stream only at one point (or part) thereof, and the polymer supply streams flow into the rotating annular stream in radial directions.

In another embodiment of the process the polymer streams are fed to the annular zone at a point where one-component polymer already forms a homogeneous outer and/or inner annular layer before rotation of the liquid streams. Still another embodiment of the process is characterized in that a first polymer stream is fed eccentrically to the annular zone and a second polymer stream enters the zone at a point where it surrounds the first stream.

In accordance with this invention a tubular film having the desired dimensions may be obtained when the film, after it has left the annular slit, is blown up to a larger diameter.

Apparatus for carrying out the above-described processes are also contemplated by the invention. The apparatus comprise a housing provided with at least two polymer supply channels, means for forming an annular zone within concentric surfaces that can be rotated relative to each other with the aid of a driving mechanism; the annular rotation zone opens into an annular extrusion slit, and for each of the different polymers one supply channel opens into the annular rotation zone approximately in the same cross-sectional plane transverse to the axis of rotation of said surfaces.

A preferred embodiment of the apparatus of this invention is characterized in that the cross sections of the outlet openings of the polymer supply channels into the annular rotation zone have an elongated shape, the long axis of which runs parallel to the axis of rotation.

The invention will be further described with reference to the accompanying schematic drawings in which:

FIG. 1 shows an axial section of the apparatus for the manufacture of a film of this invention;

FIG. 2 shows the apparatus of FIG. 1 in cross section taken along line II-II;

FIG. 3 shows a tubular film produced in accordance with the invention;

Figure 4:
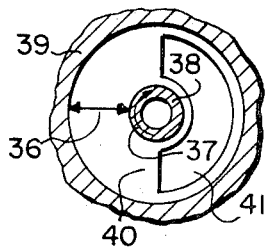
Figure 5:
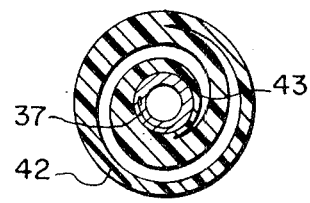
Figure 6:
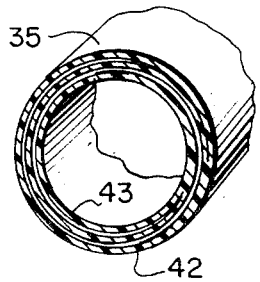
Figure 7:
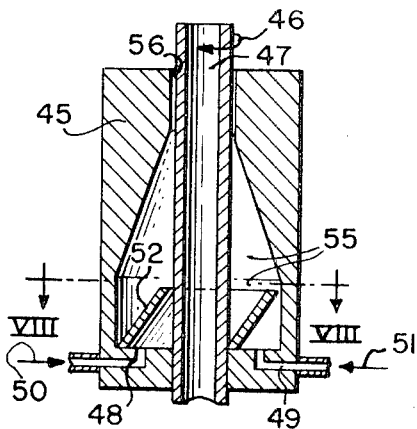
Figure 8:
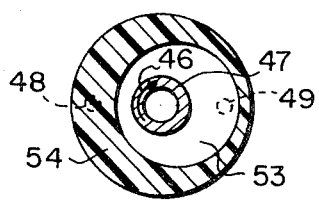
Figure 10:
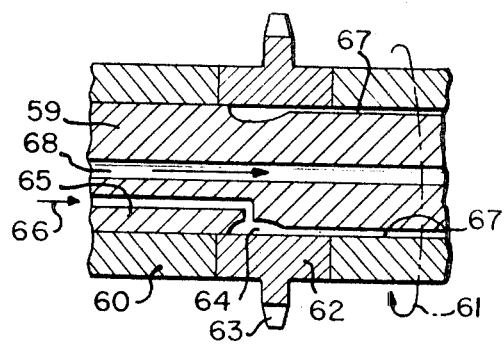
Figure 9:
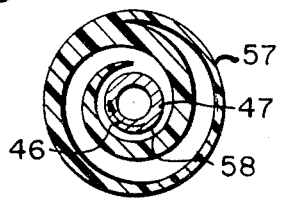

FIGS. 4 and 5, respectively, show schematic representations of other embodiments of the apparatus and the formation of a film of the invention;

FIG. 6 shows still another embodiment of the tubular film of the invention manufactured by using the apparatus represented in FIG. 4;

FIG. 7 shows still another embodiment of the apparatus;

FIG. 8 shows the polymer components entering the apparatus shown in FIG. 7 in section taken along line VIII—VIII;

FIG. 9 shows a layered film structure that can be obtained with the apparatus shown in FIG. 7; and FIG. 10 shows an axial section of still another embodiment of the apparatus of the invention that differs from that of FIGS. 1 and 2 in that it has a stationary core and a rotating jacket.

FIG. 1 shows an apparatus for the manufacture of tubular film according to the invention, and is generally indicated by reference numeral 1. The housing of the apparatus 1 comprises housing elements 2, 3, 4 and 5, which are secured to each other. Elements 4 and 5 are also suitably connected with a frame (not shown). A rotor is provided in the housing. The rotor substantially consists of rotor elements or components 6, 7 and 8 interconnected with the aid of bolts, and is supported by a friction bearing 9 and ball bearings 10, 11 which are connected with the housing element 5. The rotor 6, 7, 8 may be driven via a bushing 12, which is fastened to the rotor component 6 and to which is attached a sprocket 13. The sprocket is connected with a suitable motor by means of a chain (not shown). At the friction bearing 9 sealing between the rotor component 6 and the housing element 3 is effected with the aid of a viscoseal. Beside the friction bearing 9 there is an annular space or slit between the housing elements 2 and 3 and the rotor 6, 7, 8, which comprises four adjoining rotation zones 14, 15, 16 and 17.

The width of the slit is largest in the zone 14. At this zone two different polymers enter the slit by way of channels 20 and 21. The polymers flow through the channels in the directions indicated by arrows 18 and 19. Zone 14 of the slit gradually merges into the zone 16, the width of which becomes gradually smaller. Zone 16 opens into the extrusion zone or slit 17, which has the smallest width of the four zones. Zone 14 is relatively wide. This arrangement is determined by the relationship between the dimensions of the apparatus and the rotational speed required for obtaining a particular desired number of layers in the film products. If necessary, it is possible during operation to stop the (left-hand) element 7 of the rotor in order to remove the torque from the balloon of the freshly extruded tubular film. It is therefore necessary that a viscoseal be provided between the elements 6 and 7, which may, with the element 7 rotating, additionally be pressed against the rotating element 7 on account of the reduction of the seal diameter by the polymer pressure. On its outside surface the housing is provided with a number of electric heating elements 22 which may be activated during operation of the apparatus. Provided in the center of the rotor 6, 7, 8 is a pipe 23, through which compressed air may be supplied in the direction of the arrow 24.

As can be seen from FIGS. 1 and 2, the outlet openings 25 and 26 of the channels 20 and 21, respectively, have elongated shapes. The long axis of each outlet opening extends parallel to the axis of rotation of the rotor 6, 7, 8. The polymer supply channels 20 and 21 extend through a connecting piece 27, which is fastened in the housing element 3 and which provides a tight seal.

During operation two different liquid polymers are supplied in the directions indicated by the arrows 18 and 19, and flow side by side into the annular rotation zone 14. Owing to the rotation of the rotor relative to the housing, the number of layers in the liquid polymer stream in the zone 14 increases from 2 to, for instance, 4, 8 or 10, depending on the speed of rotation and the speed at which the annular polymer mass is extruded under the influence of the feed pressure and the resistance offered by the extrusion zone or slit 17.

The polymer supply to the annular rotation zone 14 from the two channels 20 and 21 only takes place over a relatively small part of the circumference, so that, with the direction of rotation of the rotor being as indicated in FIG. 2 (by the arrow 28), the polymer supplied through the channel 21 forms a practically uninterrupted layer on the outer circumference, while on the inner circumference of the annular zone 14 an uninterrupted layer is formed which consists entirely of the polymer supplied through the channel 20. Between the inside and outside layers, spiralling layers are formed which alternately consist of the polymers supplied through the channels 20 and 21.

When the liquid, layered polymer mass is forced successively through the consecutive annular zones 15, 16 and 17 and into the open air, the layered structure formed in the zone 14 is maintained. It will be appreciated that, depending on the residence time, the number of layers further increases as long as the polymer passes between a rotating part and a stationary part of the apparatus. The tubular film thus extruded is indicated in FIG. 1 at 29. The compressed-air supplied through the pipe 23 in the direction of the arrow 24 blows up the freshly extruded tubular film 29 to a large diameter and simultaneously cools it. Then the tubular film is wound is a known manner (not shown).

FIG. 3 schematically shows in section a tubular film 30 manufactured with the apparatus of FIGS. 1 and 2. The film 30 is made up of two different component polymers which form the wall of the film in four alternating layers (hatched and not hatched). The invention primarily relates to films having a total wall thickness that is, in general, not greater than 1 mm., and is in most cases only a few hundredths of a millimeter. The thinner films are used, more particularly, as packing material. However, the invention also contemplates tubular films having a greater wall thickness, for instance, from about 1 to about 10 mm. These tubular films may be used as tubes or transport conduits, e.g., those used for carrying liquids. Such tubular films according to the invention may also be used for the coating of cables.

As shown in FIG. 3, the inner surface of layer 31 and the outer surface of layer 32 of the film wall are each formed by a single homogeneous one-polymer layer. Between the inside layer 31 and the outside layer 32 there extend spiralling layers 33 and 34.

FIGS. 4 and 5 represent schematically other embodiments of the apparatus and formation of the tubular film according to the invention. FIG. 4 shows on an enlarged scale an annular zone 36 between a rotor 38 (which is rotatable in the direction indicated by the arrow 37), and a stationary cylindrical wall 39. FIG. 4 is a view of the apparatus toward the feed openings for two polymers located at the back of the annular zone. With the embodiment of FIG. 4 the two polymers are supplied axially by way of two feed openings 40 and 41, which together take up the entire annular space between the rotor 38 and the wall 39. The feed opening 41 only forms a semiannular space which is bounded on its inner and outer circumferences by narrow annular portions of the feed opening 40. FIG. 5 shows the layers formed of two different polymers supplied via the openings 40 and 41 after the rotor has turned through 360°. Again one polymer (shown by hatching) forms a homogeneous outside layer 42 and a homogeneous inside layer 43. Between these inner and outer layers are spiralling layers, which alternately consist of the one polymer and the other (hatched and not hatched). Upon further rotation the number of spiralling layers can be increased as desired. After the liquid polymer layers have been rotated to the desired number, the polymer mass may, in the same manner as shown in FIGS. 1 and 2, be extruded and blown up into a film product.

FIG. 6 shows a film 35 made with the apparatus of FIG. 4 and with the inside layer 43 and the outside layer 42 consisting of the same polymer.

FIG. 7 schematically shows an axial cross section of another embodiment of the apparatus for the manufacture of the tubular film according to the invention. The apparatus comprises a housing 45 in which there is mounted a rotor 47 that is rotatable in the direction indicated by the arrow 46. Two polymer channels 48 and 49 eccentrically open into the cylindrical housing. The different component polymers supplied in the directions of arrows 50 and 51 do not come into contact with each other prior to reaching the plane designated by line VIII–VIII. Owing to the presence of the oblique tube 52, the polymer supplied through the channel 48 forms, in the plane VIII–VIII, an eccentric circular polymeric portion 53, which is located in a circular polymeric portion 54 (as shown in FIG. 8) of larger diameter. It will be appreciated that the channels 48 and 49 must be provided with suitable flow resistances. In the chamber 55 of the housing 45 the two polymer streams are rotated, with the number of layers being increased. The multilayer annular stream is extruded through the annular slit 56 and blown up. FIG. 9 shows the layered stream produced by the apparatus of FIG. 7 after one revolution of the rotor. It can be seen that with the apparatus of FIG. 7 a tubular film can be made of which both the outside layer 57 and the inside layer 58 are homogeneous. However, the inside layer 58 and the outside layer 57 consist of different component polymers.

FIG. 10 shows another embodiment of an apparatus of the type shown in FIGS. 1 and 2. However, the apparatus of FIG. 10 has a stationary core 59 and a housing which consists of a stationary element 60 and an element 62 which is rotatable in the direction indicated by the arrow 61. For the purpose of being driven, the element 62 may be provided, for instance, with a chain-driven sprocket 63. Two different polymers may be fed to the annular zone 64, in which the number of layers may increase by rotation of the element 62. The sectional view presented in FIG. 10 shows only one channel 65 (of the two supply channels for the different polymers) through which one polymer may flow in the direction indicated by the arrow 66. From the annular zone 64 the multilayer liquid stream flows through the annular slit 67, and is finally extruded through an annular extrusion slit (not shown), and then cooled down. The freshly extruded tubular film can be blown up by air passed through the bore 68.

The process of the invention will be further understood by reference to the following examples:

EXAMPLE I

In this example one embodiment of a tubular film of the type illustrated in FIG. 3 was produced with the apparatus shown in FIGS. 1 and 2. In this particular embodiment, the two component polymers were polyamide and polyethylene. The speed of the rotor was kept below 10 r.p.m. Also, the dimensions and process conditions were so chosen that the resistance in the zone 14 offered by the polymers to distribution in a circumferential direction was from about 0.01 to 0.001 of the resistance to displacement in the axial direction in the zones 15, 16 and 17.

EXAMPLE II

In another embodiment for the manufacture of the tubular film according to the invention, use was made of the apparatus shown in FIGS. 1 and 2. As in example I, two streams of different polymers were supplied to the apparatus. Through the channel 21 (see FIG. 2) molten polycaprolactam was supplied at a rate of 3 kg./hour; the polymer stream had been formed by melting caprolactam (a 1 percent solution of which in 90 percent formic acid at 25° C. had a relative viscosity of from 3.7 to 4.0). Through the channel 20 molten polyethylene was supplied at a rate of about 3 kg./hour; this polymer stream had been obtained by melting polyethylene having a melt index according to ASTM D 1238 of 7. The temperatures in the supply channels for the molten polycaprolactam and for the molten polyethylene were about 310° C. and about 245° C., respectively. The temperature of the apparatus of FIG. 1 was 280° C. The speed of the rotor element 6 and the rotor part 7, which were rigidly interconnected in this experiment, was 12.5 r.p.m. From the annular slit 17, which measured 10 cm. in diameter, emerged an annular, clear polymer stream which had a layered structure. Outside the annular slit the tube was blown up to a diameter of about 17 cm. and externally cooled with air. The tubular film which was obtained, had a wall thickness of about 0.04 mm., and was wound at a speed of 4.5 meters per minute. The total number of layers in this film was approximately 6. The outer layer of the film wall consisted of a practically homogeneous layer of polycaprolactam, and the inner layer of a homogeneous layer of polyethylene. Spiralling layers of the two different polymers were arranged between the outer and inner layers in the manner illustrated in FIG. 3.

It will be appreciated that the various combinations of different, nonmiscible polymers may be used to produce the tubular film of this invention. Exemplary of these combinations are nylon and polypropylene, nylon and polyester, polypropylene and polyethylene, nylon and polystyrene, polyester and polystyrene, polyacrylonitrile and polyvinyl alcohol, nylon and polyvinyl alcohol, and the like.

Also, it will further be appreciated that the tubular films of the invention may have many different cross-sectional configurations depending on their intended applications.

What we claim is:

1. A multilayer tubular film of different thermoplastic component polymers comprising a tubular film wall made up of at least three simultaneously extruded polymeric layers that are alternately formed of different nonmiscible component polymers and that, at least partially, have a spiralling shape; at least one of the inner and outer surfaces of the film wall being formed by a single substantially homogeneous layer of one of the component polymers and at least one spiralling layer of another of the component polymers being disposed between the inner and outer surfaces; each of the spiralling layers extending, relative to the center of the tubular film wall, through an angle of at least 360°.

2. The tubular film of claim 1 in which the outer surface of the wall is formed by a single homogeneous one-polymer layer.

3. The tubular film of claim 1 in which the inner surface of the wall is formed by a single homogeneous one-polymer layer.

4. The tubular film of claim 1 in which the inner and the outer surface of the wall are each formed by a single homogeneous one-polymer layer.

5. The tubular film of claim 4 in which the homogeneous inner and outer surfaces of the film consist of the same component polymer.

6. The tubular film of claim 1 in which at least one of the two surfaces of the wall is formed by a homogeneous layer having a thickness in the radial direction that is different from that of any one of the spiralling layers.

7. The tubular film of claim 6 in which said homogeneous layer is at least 50 percent thicker than any one of the spiralling layers.

8. The tubular film of claim 7 in which said homogeneous layer is at least 50 percent thinner than any one of the spiralling layers.

9. The tubular film of claim 4 in which the inner surface and the outer surface of the wall are different component polymers.